Dec. 15, 1931.  H. L. WICK  1,836,144
AGRICULTURAL IMPLEMENT
Filed Dec. 22, 1930
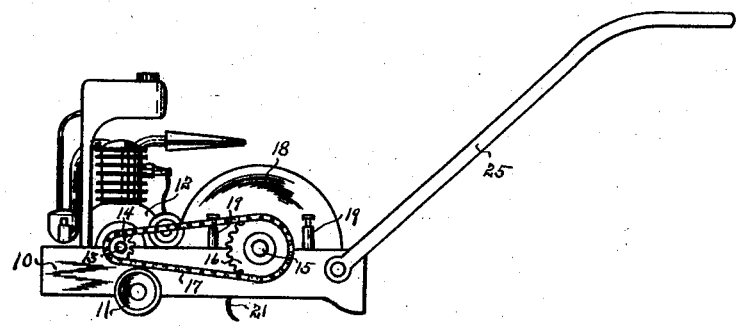
Fig. 1.
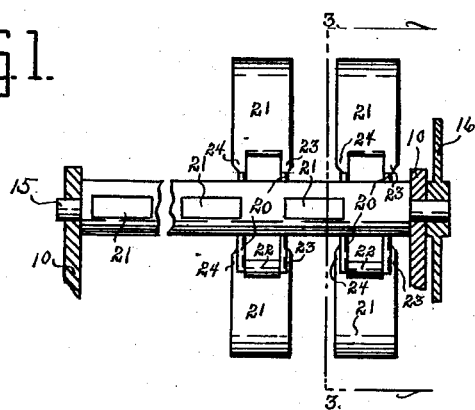
Fig. 3.   Fig. 2.
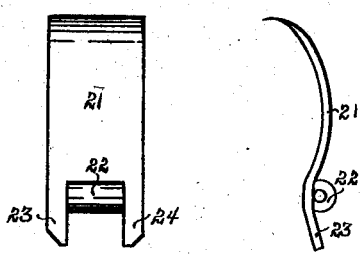
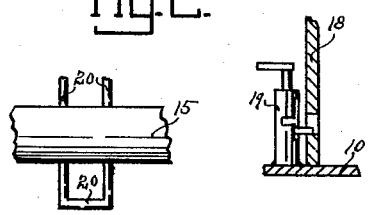
Fig. 4.   Fig. 5.   Fig. 6.   Fig. 7.
Inventor
HERMAN L. WICK
By M. Talbert Dick
Attorney Patented Dec. 15, 1931

1,836,144

UNITED STATES PATENT OFFICE

HERMAN L. WICK, OF DES MOINES, IOWA

AGRICULTURAL IMPLEMENT

Application filed December 22, 1930. Serial No. 503,910.

The principal object of my invention is to provide a ground conditioning machine that will successfully destroy all undesirable vegetation on the ground over which it passes and will leave the ground over which it passes in a desirable cultivated and mulched condition.

A further object of this invention is to provide a device for agricultural purposes that will pulverize the surface of the dirt, loam or like over which it passes, thereby destroying harmful earth insects and removing the dirt from the roots of undesirable plants which it contacts.

A still further object of my invention is to provide a field conditioning machine that may be used to cultivate corn, cotton and the like with great rapidity and without danger of burying or covering the small corn or cotton plants.

A still further object of this device is to provide an agricultural implement for the cultivating of fields and the destroying of weeds and the like, that does not unduly bank the earth over which it passes regardless of the speed at which it passes over the ground.

A still further object of this invention is to provide an agricultural implement that not only removes undesirable weeds and the like from the ground over which it passes but so mutilates the weeds that there is no possibility of them again taking root and growing.

A still further object of my invention is to provide an agricultural implement that does not easily become fouled with excessively moist earth, weeds and the like.

A still further object of my invention is to provide an agricultural implement for field conditioning purposes that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of my invention ready for use.

Fig. 2 is a front view of a portion of the cultivating and weed chopping mechanism.

Fig. 3 is a cross sectional view of the cultivating and weed chopping mechanism and is taken on line 3—3 of Fig. 2.

Fig. 4 is a front view of one of the cutting and agitating blades.

Fig. 5 is a side view of one of cutting and agitating blades.

Fig. 6 is a front view of a portion of the driven blade shaft showing one of the U-members thereon to which a blade is designed to be hingedly secured.

Fig. 7 is a side view of one of the manually operated spring hook members for holding the cultivating and chopping blade hood in a proper position on the device.

Although I have shown my device in the drawings as a small implement for the conditioning of small fields such as cotton, truck farms and the like, and may be easily incorporated in larger machines for attacking weeds and the ground surface on a large scale.

I have designated the box frame or housing of my device by the numeral 10. This housing is open at its bottom and its rear end portion, including its rear wall and rear end portions of its side walls extend downwardly to a lower point than the balance of the housing, as shown in Fig. 1. This housing at its forward end portion may be supported by any suitable casters 11. Mounted on the forward end of the housing 10 is an ordinary small internal combustion engine 12, having the drive shaft 13. Rigidly secured on this shaft 13 is a small spur gear 14. Journalled in the housing 10 and to the rear of the engine 12 is the driven cultivating and chopping blade shaft 15. Secured to one end of this shaft 15 against independent rotation and in line with the spur gear 14 is a spur gear 16 having a diameter greater than the diameter of the spur gear 14. I have used the numeral 17 to designate an endless chain embracing the spur gears 14 and 16. The numeral 18 designates a circular detachable inclosing hood member on top of the housing 10 and to the rear of the motor 12, as shown in Fig. 1. This inclosing hood member 18 is detachably held in place by the common and well known spring hook members 19, commonly used for such purpose and shown in Fig. 7. By increasing the diameter of the shaft 15 between the two sides of the housing 10 I provide the function of a flywheel, thereby reducing vibration in the shaft 15 when it is rotating and eliminating the affecting of its usual speed of rotation when the cultivating and chopping blades encounter extraordinary and intermittent resistances.

Extending radially from the enlarged portion of the shaft 15 inside the hood 18, is a plurality of square U-rods 20, as shown in Fig. 2. Hinged to the center portions of each of these U-rods is one of my cultivating and cutting blades 21. These blades are made of one piece of metal and curve forwardly toward their path of rotation as shown in Fig. 5. The method of hingedly securing each of these blades to a U-rod is to cut two parallel spaced apart longitudinal slots in their rear ends and bend the tongue 22 thus formed in a circular path around the center portion of the U-rod to which the blade is secured. By this construction two spaced apart arms 23 and 24 are formed on the rear end portion of each of the blades 21. These blades are so constructed and placed on the U-rods that these arms 23 and 24 will extend toward the shaft 15 and rest on the forward two side portions of the U-member 20 to which it is secured when the blade is extending outwardly from the shaft 15, as shown in Fig. 3. By this arrangement the swinging action of the blades 21 will be limited to one direction by the arms 23 and 24, but will be free to swing backwardly from their direction of rotation.

In other words each of the blades 21 are yieldingly held outwardly from the shaft 15 in a cutting position by centrifugal force obtained by the rapid rotation of the shaft 15, but are prevented from swinging forwardly beyond a cutting position by the arms 23 and 24 engaging the side portions of the members 20. If the blades 21 or any one of them encounter excessive resistance in their chopping and cutting function they may swing backwardly from their path of rotation and pass the encountered resistance as they are only held in a cutting position by centrifugal force.

This yielding action of the cutting blades also permits a rebounding or chopping action of the blades toward the resistance or weed which they are attacking. By the shaft 15 rotating quite rapidly, the cutting blades will strike the weed or undesirable plant at several places in its length, thereby completely mutilating the same and preventing any possibility of its again taking root and growing. This rapid action of the blades 21 also thoroughly pulverize and agitate the surface of the ground over which the device passes, thereby leaving in the wake of the device a very desirable mulch. The U-members 20 should be placed diametrically opposite from each other around the enlarged shaft 15 in order to provide correct balance and reduce vibration when the shaft 15 is rotating. These members 20 should also be close enough together longitudinally of the shaft 15, that the rows of blades 21 will slightly overlap as shown in Fig. 2, in order to uniformly attack the entire width ground surface over which the device moves.

In Fig. 1, I have designated the guiding handles of the complete device by the numeral 25. However, when my invention is incorporated in a larger implement these handles are dispensed with and the guiding and controlling of the device is accomplished in the usual manner as large agricultural implements of such nature. In order to prevent the possibility of the device becoming clogged or fouled with weeds, dirt or the like, the members 20 should not extend any great distance from the enlarged shaft 15. Also to prevent the rear corners of the blades 21 becoming fouled I have sheared them off as shown in Fig. 4.

Some changes may be made in the construction and arrangement of my improved agricultural implement without departing from the real spirit and purpose of my invention, and it is my intention to cover by my claims any modified forms of structure or use of mechanical equivalents which may be reasonably included within their scope.

I claim:

1. In a device of the class described, a frame, a shaft rotatably mounted in said frame, a means for rotating said shaft, a plurality of square U-members secured to said shaft, and a wide curved cutting and chopping blade hinged on the central portion of each of said U-members.

2. In a device of the class described, a frame, a shaft rotatably mounted in said frame, a means for rotating said shaft, a plurality of square U-members secured to said shaft, a wide curved cutting and chopping blade hinged on the central portion of each of said U-members, and an inwardly extending arm on each of said blades capable of engaging one of the side portions of the U-member to which the blade is secured.

3. In a device of the class described, a frame, a shaft rotatably mounted in said frame, a means for rotating said shaft, a plurality of square U-members secured to said shaft, a wide curved cutting and chopping blade hinged on the central portion of each of said U-members, and two arms extending inwardly from each of said blades capable of engaging the two side portions of the U-member to which the blade is secured.

4. In a device of the class described, a wheel supported frame, a shaft rotatably mounted in said frame, a means for rotating said shaft, a plurality of comparatively wide cutting blades hingedly secured to said shaft and curved forwardly toward their direction of rotation; and a means for limiting the forward swinging movement of said blades beyond predetermined positions.

HERMAN L. WICK.